Figure 1:
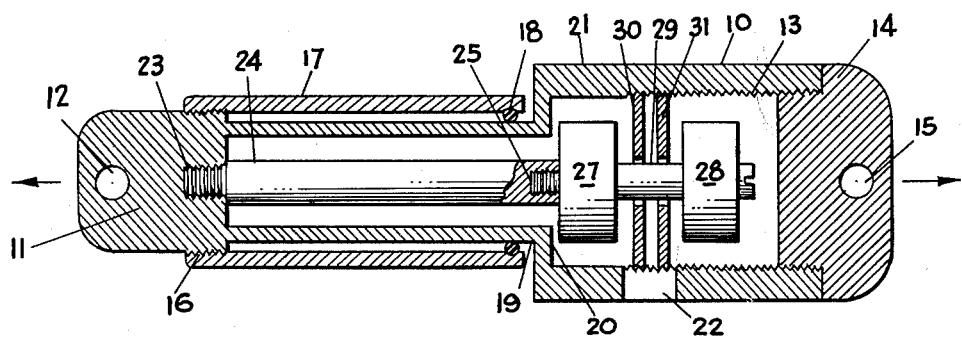

July 16, 1963     I. L. GLERUM     3,097,524

LOAD MEASURING DEVICE

Filed Feb. 8, 1960

INVENTOR.
IRVIN L. GLERUM
BY *Elliott & Pastoriza*
·ATTORNEYS·

United States Patent Office 3,097,524
Patented July 16, 1963

3,097,524
LOAD MEASURING DEVICE
Irvin L. Glerum, Canoga Park, Calif., assignor to W. C. Dillon & Company, Inc., a corporation of California
Filed Feb. 8, 1960, Ser. No. 7,311
4 Claims. (Cl. 73—141)

This invention generally relates to load or force measuring devices and instruments, for example, dynamometers, and more particularly concerns an improved load measuring device employing electro-magnetic transducer means for converting the elongation or compression of a member into an indication or reading of the force applied.

The present application is a continuation-in-part of applicant's co-pending application entitled "Dynamometer," filed October 6, 1958, Serial No. 765,593, now Patent No. 3,033,032. In the referred to application, an exemplary drawing of a preferred electro-magnetic circuit is disclosed, such circuit being equally adaptable to the load measuring device of the present invention.

The load measuring device of the present invention may be employed either in the measurement of compressional loads or forces, or in the measurement of tensile loads and forces. For illustrative purposes, however, the specification will be primarily directed towards the application in which the load measuring device of the present invention is utilized in conjunction with tensile loads.

One of the primary objects of the present invention is to provide a load measuring device or unit which may be economically constructed and manufactured of a minimum number of parts, and yet which is susceptible of being embodied within relatively small overall dimensions.

Another object of the present invention is to provide a load measuring device which does not require any appreciable amount of adjustment or maintenance during its life, and which will yield precise and accurate load or force indications over a wide range of loads.

Still another object of the present invention is to provide a structure for a load measuring device, in which the case or housing for the unit actually functions also as a primary element of the load responsive structure as well as an enclosure for protecting other elements which may be subject to deterioration if exposed to atmosphere or other media in which the apparatus is employed.

These and other objects and advantages of the present invention are generally attained by providing a load measuring device comprising generally an elongated casing with coupling means connected, respectively, to opposite ends of the casing. The coupling means are designed for connection to force exerting members for either applying tensile or compressional loads.

The casing has one portion thereof responsive and designed to change in length according to the force applied, and the casing is provided with another portion which is substantially unresponsive to the force applied.

Transducer means, preferably of the electro-mechanical type, are provided wherein two elements are employed. One of the elements of the transducer means is coupled to the one portion of the casing which is responsive to load, and the other of the elements of the transducer means is coupled to the other portion of the casing which is not responsive to loads.

In consequence, the relative positions of the transducer elements will be changed in response to the load, and a corresponding force measurement may be indicated.

Figure 2:
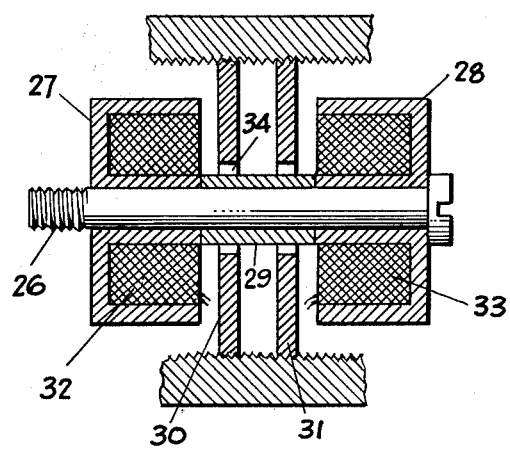

A better understanding of the load or force measuring device of the present invention may be had by reference to the drawings, showing merely an illustrative embodiment, and in which:

FIGURE 1 is a longitudinal sectional view of a load measuring device according to the present invention; and FIGURE 2 is a somewhat enlarged sectional view of the electro-magnetic transducer means employed in conjunction with the force measuring device of FIGURE 1.

Referring now to the drawings, there is shown in FIGURE 1 the load measuring device of the present invention including a housing or case 10. The case 10 has integrally formed therewith at one end a shackle 11 provided with an eye or opening 12 for coupling to some type of force exerting member. The case 10 has threadedly connected at 13 another shackle 14 at its opposite end, similarly provided with an opening 15 for coupling to another force exerting member.

The case 10 additionally includes a threaded radially projecting annular member 16 for connecting thereto a cylindrical sleeve 17. The sleeve 17 is radially spaced from the body of the casing 10, and is sealed off from the case 10 at its other end by an O ring 18 or equivalent insulating and sealing member. The function of the sleeve 17 will be more clearly understood as the specification proceeds.

The case 10 includes a minor diameter portion 19 comprising that portion of the casing most appreciably subject to or responsive to loads applied to the coupling members or shackles 11 and 14. Case 10 further includes a radially outwardly extending shoulder or flange 20 integrally connecting the portion 19 with a major diameter portion 21 of the casing. The major diameter portion 21 is substantially non-responsive to loads applied to the coupling or shackle members 11 and 14 and functions to house the primary elements of the electro-magnetic transducer means hereafter described. Some type of opening 22 is provided in the wall of the portion 21 for the purpose of connecting an electric connector or fitting.

The coupling means or shackle 11 is provided with an interior threaded bore 23 for receiving a transformer or transducer support means 24. The support means 24 is provided with at its opposite end a threaded opening 25 for receiving a screw 26.

The screw 26, as more clearly shown in the view of FIGURE 2, supports and retains opposing transformer elements 27 and 28. The transformer 27 is positively spaced from the transformer 28 by a spacer unit 29 which encircles the screw 26.

The spacer unit 29 axially extends through transformer discs 30 and 31, the latter being threadedly coupled to the interior of the casing portion 21.

The transformer discs 30 and 31 are provided with central openings, for example 34, enabling an annular clearance space between the disc and the spacer 29. As a consequence, the screw 26 may move axially with the transformers 27 and 28 relative to the substantially stationary transformer discs 30 and 31.

The transformer 27 is conventionally provided with primary and secondary coils designated by the numeral 32; similarly the transformer 28 is provided with primary and secondary coils designated by the numeral 33.

The leads from the transformers 27 and 28 as well as the power supply thereto have not been shown as the electrical circuitry is adequately and clearly explained in applicant's co-pending application, hereinbefore referred to.

The operation and functional advantages of applicant's improved load measuring device may now be described.

It will be appreciated that upon the application of a tensile force to the apparatus, the casing 10, and particularly the minor diameter portion 19 thereof will tend to elongate. Thus with the application of a tensile force, force exerting members will tend to pull the shackles 11 and 14 apart as indicated by the arrows. In consequence, the elongated minor diameter portion 19 of the casing will tend to strain and stretch throughout its length as well as to create a bending moment at the shoulder portion 20. In accordance with this objective, the wall thickness of the minor diameter portion 19 is desirably considerably less than that of the major diameter portion 21, although for purposes of illustration the thickness of the wall 19 has been shown somewhat in enlarged section.

As elongation of the wall 19 occurs, it is evident that the transformer support member 24 will tend to move towards the left, as viewed in FIGURE 1, with a consequent axial movement towards the left of the differential transformers 27 and 28 coupled thereto. As a result, the transformer 27 will move further away from its co-operating electro-magnetic element or disc 30, while the transformer 28 will move closer to its disc or electro-magnetic co-operating element 31.

Thus, an indication of the differential voltage will be obtained, for example, by employing a circuit as used in the referred to co-pending application, which will be proportional to the force applied to the shackle members 11 and 14.

Actual measurements taken with experimental units have indicated that the force indicated is directly proportional over a wide range of loads to the elongation occurring, and that adjustments or compensating scales or formulas need not be employed. In order to provide for necessary deviations which may occur in various units because of manufacturing tolerances, however, the discs 30 and 31 are independently threaded to the interior of the casing and may correspondingly be moved axially closer or apart from their, respective, co-operating transformer elements 27 and 28.

It will be appreciated that with this type of construction the discs 30 and 31 are not deflected in any manner, but rather the casing 10 and more particularly the minor diameter portion 19 thereof elongates in response to the force applied at the opposing ends of the unit.

Another important feature of the load measuring device of the present invention resides in the fact that the unit may be made temperature compensating, a condition not feasible with certain other types of load measuring structures. Thus, it has been found that by making the transformer support member 24 of "Monel" and the casing portions 19 and 20 of stainless steel that any expansion or contraction of one of these two members will be accompanied by a compensating equal and opposite expansion or contraction of the other member. Thus, upon an expansion of the stainless steel case portion 19, because of thermal conditions tending to elongate this portion, an expansion of the support member 24 will also occur offsetting the latter elongation, whereby the net movement will equal zero. Thus, the support member 24 will tend to move the screw 26 towards the right, as viewed in FIGURE 1, upon thermal expansion thereof, while the casing portion 19 will tend to move the screw 26 towards the left. In some instances beryllium may be used for the case portion 19; in such case, it is desirable that the transformer support member 24 be changed to "Dural" in order to maintain proper temperature compensation characteristics.

Also, for thermal purposes, the sleeve 17 serves as an insulating wall, whereby any temperature changes which may be imparted by the user's hands or the like are transmitted towards the shackles 11 such that the heat, for example, will be conducted equally to the casing portion 19 and the transformer support 24 in order to maintain proper temperature compensation. The sleeve 17 additionally serves the function of a shock member such that any inadvertent lateral loads or forces applied to the unit will be taken by the sleeve 17.

Also, in case of overload and breakage of shackle 15 or the connection thereto, the inner ends of sleeve 17 will contact the portion 21 and prevent transformer 28 from engaging disc 31.

It will further be appreciated that as a consequence of the construction of the improved load measuring device of the present invention that it may also be employed in fluid submersion applications as well as in gaseous atmospheres. Thus, the entire unit may be oil filled if desired without any adverse affect to the accuracy thereof, particularly in view of the temperature compensating characteristics.

Also, it is apparent that the load measuring device may equally well be employed with compressional loads. Of course, it is desirable to modify the shackles 11 and 14 to provide somewhat enlarged compressional load applying surfaces. However, such modifications are well known in the art and are not deemed to form a part of the present invention.

Other changes and modifications will occur to those skilled in the art. Thus, the illustrative embodiment shown for descriptive purposes may be varied without departing from the spirit and scope of the invention as set forth in the following claims.

What is claimed is:

1. A load measuring device comprising: an elongated casing, said casing having an integral major diameter portion and a minor diameter portion and an integral radially extending annular shoulder interconnecting said major and minor diameter portions; coupling means connected, respectively, to said major diameter portion and said minor diameter portion, said coupling means being designed for connection to force exerting members, said minor diameter portion and said shoulder being responsive and designed, respectively, to change in length and bend according to said force, and said major diameter portion being substantially unresponsive to said force; transducer means having at least two elements, one of said elements being coupled to said minor diameter portion, and the other of said elements being coupled to said major diameter portion, whereby the relative positions of said elements is changed in response to said force.

2. A load measuring device, according to claim 1, and a sleeve spaced from and substantially encircling said minor diameter portion, said sleeve having one end portion thereof secured to one end of said casing, said sleeve having its other end portion sealably connected to said minor diameter portion.

3. A load measuring device comprising: an elongated casing provided with opposite end closures; coupling means defined, respectively, by said opposite end closures; said coupling means being designed for connection to force exerting members, said casing having one portion of its length extending from one end thereof responsive and designed to change in length according to said force, and said casing having another portion of its length extending from the other end thereof substantially unresponsive to said force; transducer means having at least two elements, one of said elements being coupled to said one portion and the other of said elements being coupled to said another portion, whereby the relative positions of said elements is changed in response to said force; an elongated support member interconnecting said one portion to said one of said elements, said elongated support member being radially spaced from and disposed within said one portion, said elongated member being further supported by one of said end closures, said support member being of a first given length and formed of "Monel" metal and said one portion being of a second given length and formed of stainless steel, the ratio of said first length to said second length relative to the metals characterizing each being such as to result in equal but opposite thermal expansion of said support member and said one portion.

4. A load measuring device comprising: an elongated casing, said casing having an integral major diameter portion and a minor diameter portion, and an integral radially extending annular shoulder interconnecting said major and minor diameter portions; coupling means connected, respectively, to said major diameter portion and said minor diameter portion, said coupling means being designed for connection to force exerting members, said minor diameter portion and said shoulder being responsive and designed, respectively, to change in length and bend according to said force, and said major diameter portion being substantially unresponsive to said force; transducer means having at least two elements, one of said elements being coupled to said minor diameter portion, and the other of said elements being coupled to said major diameter portion, whereby the relative positions of said elements is charged in response to said force; and, a thermal protective sleeve spaced from and substantially encircling said minor diameter portion, said sleeve having an end portion thereof secured to one end of said casing and its other end portion insulated from and sealably coupled to said minor diameter portion.

References Cited in the file of this patent

UNITED STATES PATENTS

| | | |
|---|---|---|
| 2,390,304 | Hitchen | Dec. 4, 1945 |
| 2,452,862 | Neff | Nov. 2, 1948 |
| 2,453,550 | Statham | Nov. 9, 1948 |
| 2,632,149 | Baker | Mar. 17, 1953 |
| 2,764,658 | Statham | Sept. 25, 1956 |
| 2,839,919 | Lathrop | June 24, 1958 |
| 2,854,646 | De Michele | Sept. 30, 1958 |

FOREIGN PATENTS

| | | |
|---|---|---|
| 989,747 | France | Sept. 12, 1951 |
| 74,057 | Netherlands | Feb. 15, 1954 |